(12) United States Patent
Goolsby et al.

(10) Patent No.: US 7,431,826 B2
(45) Date of Patent: Oct. 7, 2008

(54) DISCARDED FCC EQUILIBRIUM CATALYST THROUGH RECLAMATION

(75) Inventors: Terry L. Goolsby, Katy, TX (US); Melissa Hayes, Brook Park, OH (US)

(73) Assignee: Metal Alloy Reclaimers, Inc. II., Cleveland, OH (US)

( * ) Notice: Subject to any disclaimer, the term of this patent is extended or adjusted under 35 U.S.C. 154(b) by 575 days.

(21) Appl. No.: 11/065,826

(22) Filed: Feb. 25, 2005

(65) Prior Publication Data

US 2005/0199554 A1  Sep. 15, 2005

Related U.S. Application Data

(60) Provisional application No. 60/547,949, filed on Feb. 26, 2004.

(51) Int. Cl.
C10G 11/04 (2006.01)
(52) U.S. Cl. .................. 208/113; 208/120.01; 208/152; 208/161
(58) Field of Classification Search ................. 208/113, 208/120.01, 152, 161
See application file for complete search history.

(56) References Cited

U.S. PATENT DOCUMENTS

| | | | |
|---|---|---|---|
| 4,406,773 A | 9/1983 | Hettinger, Jr. et al. | |
| 5,147,527 A | 9/1992 | Hettinger | |
| 5,171,424 A | 12/1992 | Hettinger | |
| 5,190,635 A | 3/1993 | Hettinger | |
| 5,198,098 A | 3/1993 | Hettinger | |
| 5,230,869 A | 7/1993 | Hettinger et al. | |
| 5,250,482 A | 10/1993 | Doctor | |
| 5,328,594 A | 7/1994 | Hettinger | |
| 5,364,827 A | 11/1994 | Hettinger et al. | |
| 5,393,412 A | 2/1995 | Hettinger | |
| RE35,046 E | 10/1995 | Hettinger, Jr. et al. | |
| 5,516,420 A | 5/1996 | Henton | |
| 5,538,624 A | 7/1996 | Hettinger | |
| 5,636,747 A | 6/1997 | Hettinger, Jr. et al. | |
| 5,746,321 A * | 5/1998 | Hettinger et al. ............ 209/233 | |
| 5,958,219 A | 9/1999 | Goolsby et al. | |
| 5,972,201 A | 10/1999 | Goolsby et al. | |
| 5,985,134 A | 11/1999 | Goolsby et al. | |
| 6,041,942 A * | 3/2000 | Goolsby ..................... 209/219 | |

(Continued)

OTHER PUBLICATIONS

Goolsby, T.L., et al., "Improved FCC Performance by Catalyst Upgrading with Magnetic Separation," Symposium on Recent Advances in Petroleum Refining, 1993 Spring National AIChE Meeting, Paper 64E, Houston, TX (Mar. 1993).

(Continued)

Primary Examiner—Tam M Nguyen
(74) Attorney, Agent, or Firm—Wilmer Cutler Pickering Hale & Dorr LLP.

(57) ABSTRACT

The invention relates to the partial recovery of discarded, spent, or waste fluid catalytic cracking (FCC) equilibrium catalyst by use of a separation device located off site, away from any FCC Process unit or Petroleum Refining area, whereby the separation of recoverable material is achieved by means of both magnetic properties exhibited from contaminated metals deposited on individual catalyst particles and inertial or momentum contributions based on size and density of each individual catalyst particle. The invention provides a process to recover twenty to forty percent of the original discarded, spent, or waste FCC equilibrium catalyst for reuse.

40 Claims, 3 Drawing Sheets

U.S. PATENT DOCUMENTS

| | | | |
|---|---|---|---|
| 6,059,959 | A | 5/2000 | Goolsby |
| 6,099,721 | A * | 8/2000 | Goolsby et al. ........ 208/120.01 |
| 6,194,337 | B1 | 2/2001 | Goolsby et al. |

OTHER PUBLICATIONS

Goolsby, T.L., et al., "FCC Unit Optimization Using the MagnaCat Process," 1997 Annual NPRA Meeting, Paper No. AM 97-32, San Antonion, TX (Mar. 18, 1997).

Goolsby, T.L., "Development of FCC Catalyst Magnetic Separation," Separation Science, and Technology v. 32, n 1-4 (1997).

Goolsby, T.L., et al., "A New Approach to FCC Unit Optimisation," Petroleum Technology Quarterly, London, v2 n3 (Autumn, 1997).

Goolsby, T.L., "FCC Catalyst Management with MagnaCat," Hydrocarbon Engineering (Mar. 1998).

Patent Cooperation Treaty, International Search Result, 2 pages, Mar. 9, 2007.

Johnson, T. E., T. L. Goolsby, M. A. Silverman, D. C. Kowalczyk, and H. F. Moore, "Catalyst Separation Technology Improves FCC Gasoline Yields," Oil & Gas Journal (Jun. 15, 1998) (5 pages).

Johnson, T. E.; D. C. Kowalczyk; T. L. Goolsby; M. A. Silverman; H. F. Moore, "Developments in MagnaCat Technology," Hydrocarbon Asia (ISSN 02171112) V9 3:46-52 (Apr. 1999) (12 pages).

Rik Miller and Terry Goolsby, "Japan Refiner Improves FCC Operations Using Catalyst Separation Technology", Oil & Gas Journal, p. 60-64 (Jan. 28, 2002) (5 pages).

Goolsby, T. L., and H. F. Moore, "Commercial MagnaCat Process: Results From the Use of Dry Magnetic Separation Technology," Conference on Dry Separation Processes, Lexington, KY (Oct. 1997) (16 pages).

Johnson, T. E., T. L. Goolsby, R. B. Miller, F. Fujii, M. Hara, D. C. Kowalczyk, and R. J. Campagna, "Successful Implementation of MagnaCatÔ Technology at KPI's Chiba Refinery," 2000 Japanese Petroleum Institute (JPI) Paper, Tokyo. Japan (Oct. 2000) (12 pages).

* cited by examiner

DISCARDED FCC EQUILIBRIUM CATALYST THROUGH RECLAMATION

BACKGROUND OF THE INVENTION

1. Field of the Invention

This invention relates to processes for the reclamation or partial recovery of discarded fluid catalytic cracking ("FCC") equilibrium catalyst. In particular, the invention relates to a process for reclaiming discarded FCC equilibrium catalyst ("catalyst" or "ECAT") containing low levels of metal contaminants using the principles of magnetic separation. More particularly, the invention relates to the use of magnetic separation off-site and away from any FCC process unit or petroleum refining process for the purpose of reclaiming FCC equilibrium catalyst containing low levels of metal contaminants.

2. Background of the Invention

FCC equilibrium catalysts are used in the petroleum refining industry to convert crude oil fractions into smaller molecular weight hydrocarbon compounds. FCC catalysts are typically composed of particles of sprayed dried mixture of kaolin clay and zeolite in a silica or alumina binding agent ranging in size from approximately four microns to approximately 130 microns. A typical FCC unit contains several hundred tons of catalyst. Small FCC units may contain only fifty tons, while some larger units contain 500 or more tons. The catalyst particles circulate throughout the FCC unit at rates of 10-14 tons per minute. For example, a three-hundred ton inventory FCC unit will circulate its inventory sixty-seven times per day, at a 6.3 catalyst to oil ratio in the FCC riser reactor or at a feed rate of approximately 267,000 pounds per hour. During the cracking process, the FCC catalyst accumulates contaminants such as nickel, vanadium, iron, calcium, and various other metals. These contaminants decrease the effectiveness of the catalyst (i.e., the ability to convert crude oil fractions into desirable products). The longer the catalyst particles remain in the unit, the more metal contaminants they accumulate. Particle age is typically expressed in terms of the number of days the particle has been in the FCC unit. Thus, "older" particles (e.g., 100 days or more) have commensurately lower activity than "younger" particles (e.g., 50 days or less) that have not been in the FCC unit as long. Accordingly, older catalyst particles are unable to convert the petroleum oil effectively into consumer products.

Because of this constant loss of catalytic activity, "fresh" catalyst needs to be added to the FCC inventory to maintain the catalytic activity of the system at the required level. Thus, all FCC units periodically remove a portion of the catalyst from the FCC unit and replace it with fresh catalyst to maintain catalyst activity and to manage the metals content of the FCC catalyst inventory. For example, in some FCC units, approximately six tons of new catalyst per day is added to maintain activity. A similarly-sized fraction of used catalyst must be removed to make room for the fresh catalyst being added. Presently, catalyst that is removed from FCC units is discarded into landfills or reused in alternative applications, such as cement or asphalt filler.

A significant fraction of particles that are removed from the FCC unit each day retains catalytic activity, however. Specifically, 20-40% of the particles in any fraction of equilibrium catalyst are fifty days old or less. As previously noted, these particles have not been in the FCC unit as long as the older particles and will retain catalytic activity. Presently, however, there is no feasible mechanism to separate these younger particles containing lower metal content from the older particles that no longer have catalytic activity due to their higher metal content.

In some cases, rather than replacing the spent catalyst with completely new catalyst, the contaminated catalyst is regenerated and then recycled back into the FCC unit. Magnetic separation is one process that has been used to reclaim FCC catalyst. Magnetic separation of metals-contaminated equilibrium catalyst (ECAT) from ECAT particles having a lower metal content has previously been commercialized. See, e.g., U.S. Pat. No. 4,406,773 (Hettinger et al.); U.S. Pat. No. 5,147,527 (Hettinger et al.); U.S. Pat. No. 5,171,424 (Hettinger); U.S. Pat. No. 5,190,635 (Hettinger); U.S. Pat. No. 5,198,098 (Hettinger); U.S. Pat. No. 5,230,869 (Hettinger et al.); U.S. Pat. No. 5,328,594 (Hettinger); U.S. Pat. No. 5,364,827 (Hettinger et al.); U.S. Pat. No. 5,393,412 (Hettinger); U.S. Pat. No. 5,538,624 (Hettinger); U.S. Pat. No. 5,958,219 (Goolsby); U.S. Pat. No. 6,041,942 (Goolsby); U.S. 6,099,721 (Goolsby); U.S. Pat. No. 6,194,337 (Goolsby); and U.S. Reissue Pat. No. 35,046 (Hettinger et al.) all of which are hereby incorporated by reference. Some other work has been done in the area of magnetic separation of FCC catalyst. U.S. Pat. No. 5,250,482 (Doctor), which is hereby incorporated by reference, describes a super-cooled, quadruple open-gradient magnetic separation system to separate ECAT having more than about 2000 ppm nickel equivalents from ECAT having less about 2000 ppm nickel equivalents.

One process for recycling FCC catalyst with high metal content is the MagnaCat™ process. The MagnaCat™ process is integrated into the FCC unit and removes catalyst particles that are contaminated with high levels of metals and having high magnetic properties. The MagnaCat™ process discards 10-30% of these highly contaminated particles, while 70 to 90% of the remaining treated catalyst is recycled directly back into the FCC unit. However, only about 30% of the FCC units in the world can utilize the MagnaCat™ process due to the requirements of high metals content and the associated magnetic properties needed to effectively utilize the separation technology. This leaves about 70% of the world's FCC units that discard large amounts of catalyst daily. Thus, the majority of FCC units are unable to take advantage of the environmental benefits of the recycling process.

A significant drawback to the magnetic processes known in the art is that they require dedication of the magnetic separation apparatus to a particular FCC unit. For example, Hettinger et al. U.S. Pat. No. 4,406,773 describe the use of an electromagnetic and/or permanent magnetic separation process which is directly associated with a high carbo-metallic feed FCC process unit in order to separate the older, high metals FCC ECAT from the younger FCC ECAT and directly recycling the recovered ECAT back into the FCC regenerator of the FCC Process unit with high carbo-metallic feed FCC operation.

However, because of the requirement that the magnetic separation unit be integrated into the FCC process, refiners are presently limited in the amount of FCC catalyst they can reclaim and recycle within their company if they have more than one FCC unit. Specifically, such on-line separation systems are only able to separate and remove the oldest catalyst particles, which contain the most metal. For example, Hettinger et al., U.S. Pat. Nos. 4,406,773 and 5,147,527 require that the FCC ECAT magnetic separation be performed on ECAT having 1000 ppm to 30,000 ppm nickel equivalents of heavy metal(s) and/or metal compound(s) measured in regenerated equilibrium catalyst. Similarly, the MagnaCat™ system separates particles with magnetic susceptibility values at least as large as $5\times10^{-6}$ to $10\times10^{-6}$ emu/g (electron mass units per gram), Hettinger et al., U.S. Pat. No. 5,190,635. As a result, these systems are only able to remove the material having the most magnetic content, which represents approximately 10-20% of the total inventory in the FCC unit. Metals levels for these high magnetic fractions range from 1600 to 2500 ppm nickel and 6000 to 10,000 ppm iron with the magnetic susceptibilities ranging from $20 \times 10^{-6}$ emu/g to $60 \times 10^{-6}$ emu/g.

Moreover, because the magnetic separation systems known in the art are integrated into the FCC unit, the recycled ECAT must be reintroduced into the same FCC unit from which it was originally extracted. With the consolidation of refineries within the industry, a refinery group may want to cascade its own ECAT within its system (i.e., taking catalyst from one refinery FCC unit and adding to a different refinery FCC unit).

A still further limitation of processes that are integrated into the FCC unit is that they require an additional cooling step before the ECAT can be reclaimed. The high temperatures of an FCC unit decrease the magnetic properties of the material. In order to achieve effective magnetic separation, the material must be cooled to increase its magnetic properties. Hettinger et al. describe an elaborate cooling system that must be implemented before the ECAT can be processed. The catalyst is removed from a hot FCC regenerator at a temperature of about 900-1400° F., and under a pressure of about 10-50 pounds per square inch absolute. Handling and controlling the hot catalyst from the FCC unit under pressure can be difficult, dangerous, and expensive if not performed with the appropriate safety measures. The external surface of the catalyst transfer pipe can become red hot due to heat transfer from the catalyst before the catalyst enters the catalyst cooler, which could cause significant burns to refinery personnel if not addressed. Cooling the catalyst from 1400° F. to 300° F. is difficult and requires an expensive cooler with extensive piping and controls for the cooling medium. Erosion of the catalyst transfer pipes used to pneumatically transfer the catalyst to the process unit can also become a maintenance issue.

Also, because the reclaimed catalyst is recycled directly into the FCC unit, integrated processes require an additional line into the FCC regenerator with either a valve or continuous air to prevent catalyst from exiting the FCC unit. These lines can become plugged if the conditions or air are not monitored. As a result of these limitations, the use of these processes is strictly limited.

SUMMARY OF THE INVENTION

The magnetic separation processes of the invention solve these problems by uncoupling the magnetic separation apparatus from the FCC unit. The novel separation processes of the invention are able to recover a large amount of FCC equilibrium catalyst contaminated with lower amounts of metals for the FCC equilibrium catalyst market. Because the magnetic separation processes of the invention are stand-alone operations, the safety of the reclamation process is increased. Moreover, the processes of the present invention allow processors to recycle a much greater percentage of their spent FCC catalyst, allowing for improved environmental impact. The present processes also provide processors a wider variety of options for using the reclaimed FCC catalyst.

In accordance with this invention a process is provided for recovering discarded, spent, or waste FCC equilibrium catalyst. In one aspect, the process includes the steps of: (a) transporting the FCC equilibrium catalyst from an FCC operation to a site located apart from the FCC operation, (b) transferring the catalyst to a receiving means for processing into at least one separation device, (c) separating the catalyst into a discard fraction, having higher metals content and lower activity, and a recovered fraction, having low metals content, and (d) transferring the recovered fraction for reuse. Each separation device of the invention includes a plurality of magnets, which operate with sufficient speed to impart momentum energy to the catalyst particles, and a belt. In one aspect, the separating step of the invention includes the steps of: (i) passing a thin layer of catalyst through the separation device at a belt speed sufficient to produce a fan-shaped distribution leaving the belt, whereby the higher magnetic catalyst particles adhere to the belt; (ii) adjusting a splitter into the fan-shaped distribution to capture the discard fraction; and (iii) gravity feeding the recovered fraction into a receiving means. In some embodiments, the process includes more than one separation device. In one embodiment, there are two separation devices. In another embodiment, there are three separation devices. In a further embodiment, there are four separation devices. The separation devices are arranged in parallel or in serial.

Another aspect of the invention relates to recovered FCC equilibrium catalyst produced from the process described above.

A further aspect of the invention is a process of reusing FCC equilibrium catalyst, which includes the steps of: (a) transporting waste FCC equilibrium catalyst from an FCC operation to a site located apart from the FCC operation; (b) transferring the catalyst to a receiving means for processing into at least one separation device; (c) separating the catalyst into a discard fraction, having higher metals content and lower activity, and a recovered fraction, having low metals content; and (d) transferring the discard fraction for reuse. Each separation device of this aspect of the invention includes (i) a plurality of magnets, which operates with sufficient speed to impart momentum energy to the particles, and a belt. The separating step of this aspect of the invention includes the steps of: (i) passing a thin layer of catalyst through the separation device at a belt speed sufficient to produce a fan-shaped distribution leaving the belts, whereby the higher magnetic catalyst particles adhere to the belt; (ii) adjusting a splitter into the fan-shaped distribution to capture the discard fraction; and (iii) gravity feeding the recovered fraction into a receiving means. In some embodiments, the process includes more than one separation device. In one embodiment, there are two separation devices. In another embodiment, there are three separation devices. In a further embodiment, there are four separation devices. The separation devices are arranged in parallel or in serial.

DETAILED DESCRIPTION

The invention is directed to the reclamation or partial recovery of discarded, spent, or waste fluid catalytic cracking ("FCC") equilibrium catalyst ("catalyst" or "ECAT"), which is reclaimed by use of a magnetic separation device. The process is located off site and away from any FCC process unit or petroleum refining area. Separation and recovery of the FCC ECAT having lower metal content and higher activity is achieved by both the magnetic properties of the metal contaminants deposited on each catalyst particle and on the inertial contributions (e.g., size and density) of each catalyst particle. The processes of the present invention remove the older catalyst particles (i.e., those particles that have been in the unit more than about 50 or fewer days) from the FCC ECAT feed steam, while recovering the younger portion of the FCC ECAT (i.e., the portion that has been in the FCC process unit for less than about 50 or fewer days). These processes produce improved FCC equilibrium catalyst for reuse while providing valuable recycling technology, thus improving the FCC equilibrium catalyst in the catalyst market, and environmentally reducing waste catalyst.

It is accordingly one object of this invention to provide a process for recovering FCC equilibrium catalyst having low metal content from discarded, spent, or waste FCC equilibrium catalyst from a petroleum refiner. The present invention provides a means to recover a portion of waste FCC equilibrium catalyst with improved magnetic separation configuration. The magnetic separator of the invention has a magnetic roller and a non-magnetic roller; the magnetic roller has a plurality of disc-shaped magnets. In one embodiment, the separation device comprises a permanent magnet. In another embodiment, the separation device comprises an electro-magnet. In a further embodiment, the separation device comprises both a permanent magnet and an electro-magnet. The separator also has a belt upon which the waste FCC equilibrium catalyst is fed in a thin layer. In some embodiments, the catalyst is fed by a vibratory feeder system. The magnetic field created by the plurality of magnets causes the catalyst particles having paramagnetic and/or ferromagnetic properties (i.e., those containing relatively high amounts of metal) to adhere to the belt in the vicinity of the magnetic roller. Particles not having ferromagnetic and/or paramagnetic properties are carried further by inertial and gravitational influences than those with the paramagnetic and/or ferromagnetic properties. The methods and apparatus of the present invention provide a concentrated magnetic field, longer contact time, and improved inertial impedance than other available processes.

Figure 1:
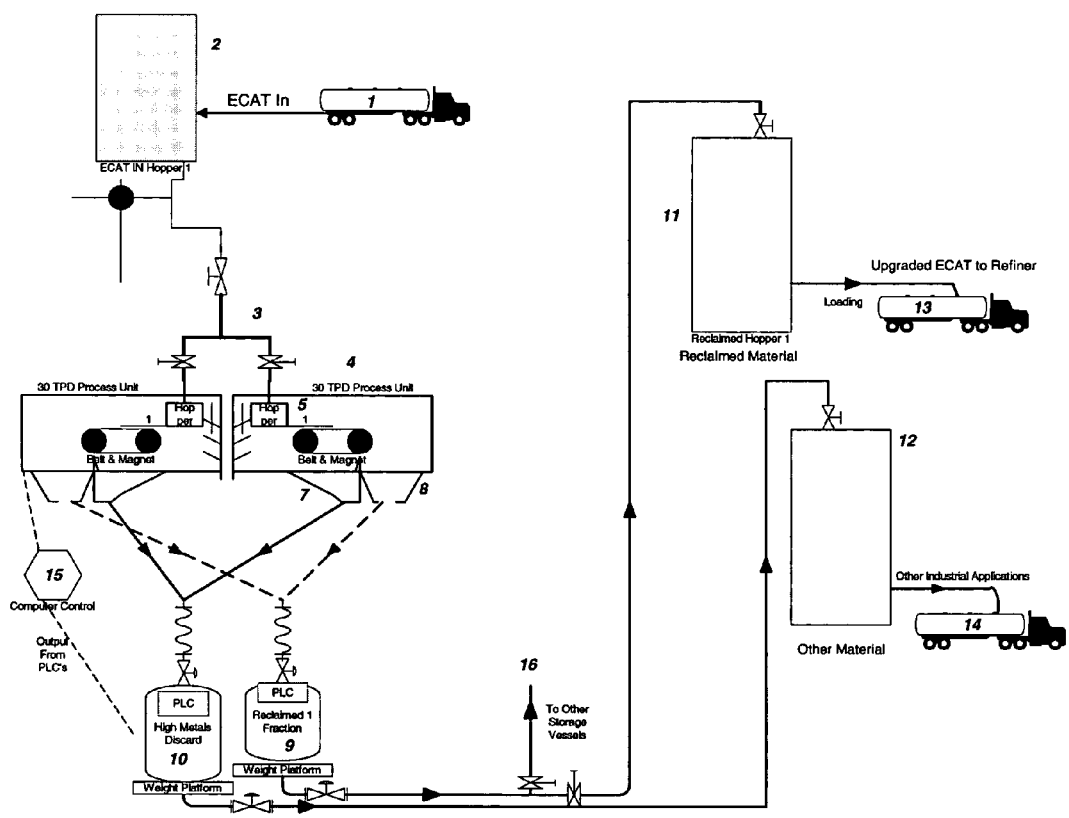
FIG. 1 is a flow diagram of an exemplary recovery operation of the invention.

FIG. 1 shows one embodiment of the partial recovery of discarded spent, or waste FCC equilibrium catalyst using two separating devices. Referring to FIG. 1, discarded, spent, or waste FCC equilibrium catalyst arrives at the process facility per transport 1 and unloads into a storage hopper 2 where it waits to be processed. The catalyst moves through pipes 3 and is distributed into two separation devices 4. In one embodiment, a second, smaller hopper is located immediately prior to the separation devices 4. In one embodiment, this smaller hopper is located between storage hopper 2 and pipes 3. This second hopper provides a constant feed of equilibrium catalyst to the separation unit(s). In another embodiment, the smaller hopper is located between pipes 3 and the separation devices 4. In one embodiment, the catalyst is passed through the separation device on a dry basis. The undesirable catalyst fraction falls into the discard catalyst collection bin 7, while the desired recoverable catalyst fraction ("recovered fraction") falls into the recoverable catalyst collection bin 8. The discard fractions from both separation devices are combined into a pneumatic transfer hopper 10. When the pneumatic transfer hopper is full, the discard fraction is transferred by dense phase into storage hopper 12. The desirable recovered fraction of the catalyst from both separation devices is combined into a pneumatic transfer hopper 9. When the pneumatic transfer hopper is full, the recovered catalyst is transferred by dense phase into storage hopper 11. In some embodiments, the recovered catalyst fraction is directly transferred into a rail car or truck tank directly per piping 16. In some embodiments, the desirable recovered catalyst fraction is then transferred into a truck tank 13 from storage 11. In some embodiments, the discarded catalyst is transferred into a truck tank 14 from storage 12 for use in other industrial applications. A computer 15 controls the process. While the description of this embodiment of the invention is provided in a step-wise manner, it will be appreciated that the steps may be performed in different order and that no step is essential to the invention.

Figure 2:
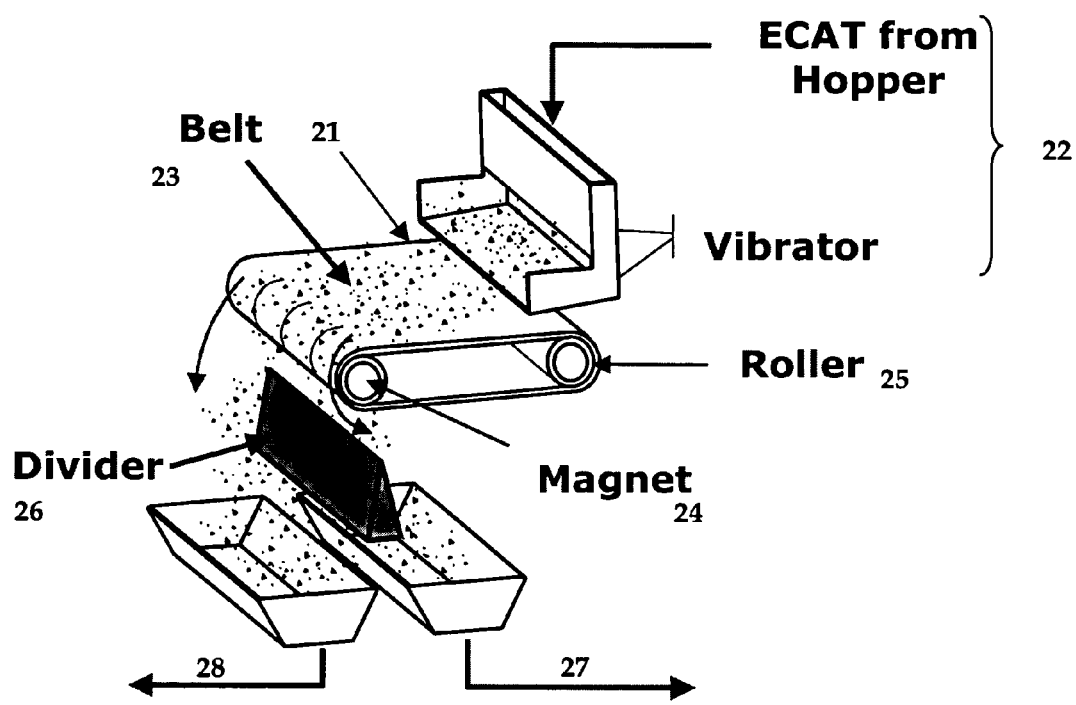
FIG. 2 is a graphical depiction of an exemplary separation device of the invention.
Figure 3:
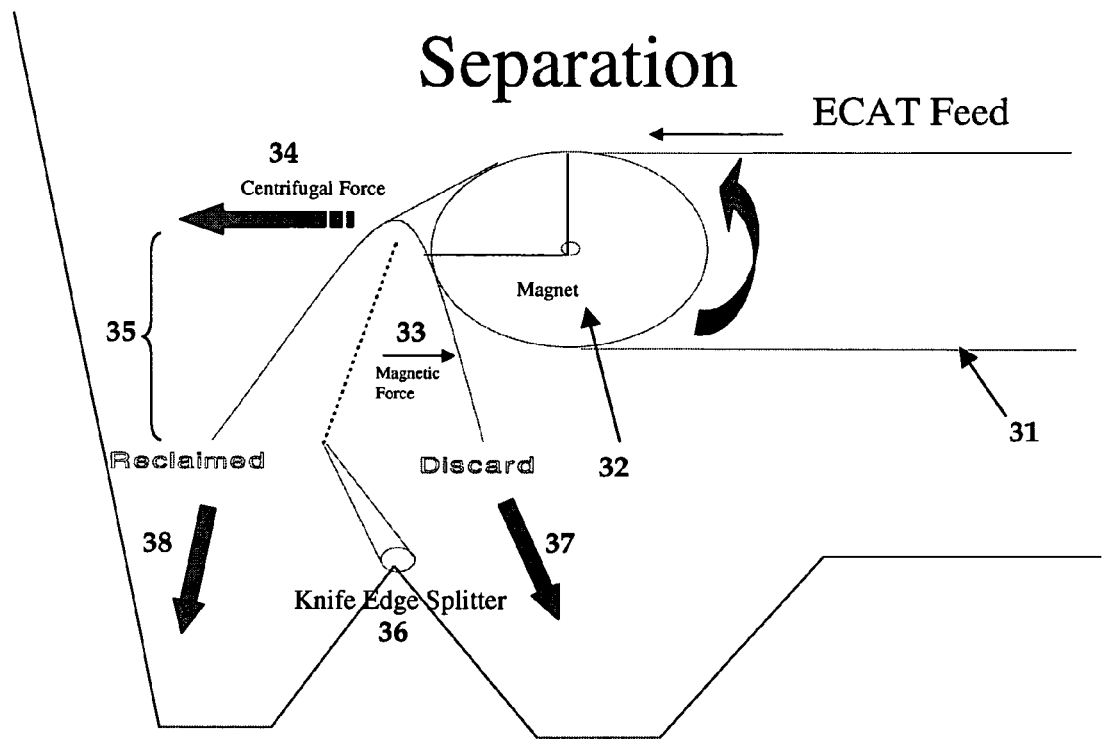
FIG. 3 is another graphical depiction of an exemplary separation device of the invention, further demonstrating the forces applied to the catalyst particles during the process of the invention.

FIGS. 2 and 3 depict the configuration of the separation device of one aspect of the invention in more detail. As shown in FIG. 2, the catalyst particles 21 flow from the feed system 22 onto the belt (23, 31). The rotation of the plurality of magnets (24, 32) and the roller 25 causes the belt to move, carrying the catalyst particles away from the feed system. The catalyst flows at a sufficient speed to effect partial segregation according to the magnetic properties of the material. Catalyst particles containing higher levels of metal adhere to the belt by virtue of the attraction 33 from the magnet. At the same time, the speed of the belt applies a centrifugal force 34 to the particles. In some embodiments, the desired recovered fraction collects into a separate collection means 28, 38 for reuse and recycling. The combination of magnetic field of the magnet and the centrifugal force causes the particles to come off the belt in a fan-shaped pattern 35. The catalyst particles in the "fan" form a gradient based on their metal content. In some embodiments, further separation is achieved by applying a splitter or a divider (26, 36) into the fan to collect more of the undesirable discard catalyst fraction (27, 37). In one embodiment, the splitter includes a single knife device located under the plurality of the magnets to efficiently cut into the catalyst fan, thereby increasing the amount of discarded product.

In one embodiment, the process also includes a step of passing the catalyst through a filter screen, resulting in the elimination of unwanted, or trash, material. In some embodiments, this step is performed after the step of transporting the FCC equilibrium catalyst to a site located apart from the FCC operation(s) where the catalyst was sourced. In this embodiment, the catalyst is passed through a filter screen before it is transferred into one or more separation devices. Referring to FIG. 1, in one embodiment, the filter is located between transport 1 and storage hopper 2. In another embodiment, the filter is located between storage hopper 2 and pipes 3, immediately preceding distribution into the separation devices 4. In other embodiments, this step is performed at another part of the separation procedure. In one nonlimiting example, the filtering step is performed after the catalyst has been separated into a discard fraction and a recovered fraction. In this embodiment, the filtering procedure is performed on either the discard fraction or on the recovered fraction, depending on the ultimate disposition of the material. In another nonlimiting example, the filtering step is performed after the recovered fraction is transferred for reuse. Examples of unwanted material that is eliminated by passing the catalyst through a filter screen include, without limitation, metal fragments, refractory (e.g., a coating on the inside of the FCC unit that prevents erosion of the reactor), materials greater than a particular sieve size. In one embodiment, the filter size is about 35 sieve. In another embodiment, the filter size is about 500 micron. In a further embodiment, the filter size is about 100 sieve to about ¾ inch. In yet another embodiment, the filter size is about 100 sieve to about ½ inch. In a still further embodiment, the filter size is about 100 sieve to about ¼ inch. In another embodiment, the filter size is about 100 sieve to about 35 sieve. In another embodiment, the filter size is about 50 sieve to about 35 sieve. In another embodiment, the filter size is about 35 sieve to about ¼ inch. In another embodiment, the filter size is about ¼ inch to about ¾ inch. In another embodiment, the filter size is about ¼ inch to about ½ inch. In another embodiment, the filter size is about ¼ inch to about ⅝ inch. In another embodiment, the filter size is about ¼ inch. For purposes of this invention filter sizes are listed as American ASTM sizes. However, equivalent international sieve sizes and Tyler sizes are also contemplated by the invention.

In one embodiment, the discard fraction of the equilibrium catalyst is recycled to other industrial applications. Examples of such applications include, without limitation, cement, asphalt filler, and slag conditioners.

In one embodiment, the recovered fraction is redistributed into an FCC cracking unit. In another embodiment, the FCC cracking unit is different from the FCC cracking unit where the waste catalyst was sourced. In another embodiment, the FCC cracking unit is the same FCC cracking unit where the waste catalyst was sourced. That is, after treatment, the recovered fraction (i.e., the treated FCC equilibrium catalyst) is returned to the FCC cracking unit or operation where the waste catalyst was sourced.

In one aspect, the processes of the invention are directed to magnetic separation of FCC equilibrium catalyst having low metal content. Accordingly, in one embodiment, low metal content FCC equilibrium catalyst is recovered from the process of the invention. In another embodiment, the recovered fraction has higher catalytic activity that either the discarded fraction or the incoming waste FCC equilibrium catalyst. In one embodiment, using the processes of the invention, approximately 5 to 40% of the equilibrium catalyst is recovered. This material is the most active and "youngest" of the material present in the catalyst. In one embodiment, approximately 10-30% of the low-metal equilibrium catalyst is recovered. In another embodiment, approximately 15-25% of the low-metal equilibrium catalyst is recovered. In a further embodiment, approximately, 5% of the low-metal equilibrium catalyst is recovered. In yet another embodiment, approximately 10% of the low-metal equilibrium catalyst is recovered. In still another embodiment, approximately 20% of the low-metal equilibrium catalyst is recovered. In another embodiment, approximately 30% of the low-metal equilibrium catalyst is recovered.

Accordingly, in some aspects of the invention, approximately 60-95% of the equilibrium catalyst having high levels of metals ("high-metals catalyst") is retained in the discard fraction. In one embodiment, about 50% of the high-metals material in the catalyst is retained in the discard fraction. In another embodiment, about 55-60% of the high-metals material in the catalyst is retained in the discard fraction. In a further embodiment, about 60-90% of the high-metals material in the catalyst is retained in the discard fraction. In yet another embodiment, about 60-80% of the high-metals material in the catalyst is retained in the discard fraction. In yet another embodiment, about 60-70% of the high-metals material in the catalyst is retained in the discard fraction. In a further embodiment, about 70-80% of the high-metals material in the catalyst is retained in the discard fraction.

Magnetic separation takes place due to the magnetic properties of the various metals on the particles. The metal accumulation on each particle imparts paramagnetic and ferromagnetic properties to that particle. The main metals that affect the magnetic properties of each particle are nickel and iron. In some embodiments, FCC ECAT that is withdrawn from a FCC unit for disposal may contain about 100 ppm to about 3000 ppm (parts per million) added nickel and/or about 100 ppm to about 3000 ppm added iron from processing crude oil fractions in the FCC unit. The magnetic properties of the particles are determined by the magnetic susceptibility, which is expressed in electron mass units per gram (emu/g). This value determines the attraction of the particles to the magnetic poles on the magnet roll.

In some embodiments, the catalyst being processed has nickel content from about 500 ppm to about 1500 ppm and low iron content in the range of about 4000 ppm to about 6000 ppm, which results in a magnetic susceptibility below about $4.5 \times 10^{-6}$ emu/g for the whole FCC ECAT. In one embodiment, the catalyst contains about 750 to about 1250 ppm nickel. In another embodiment, the catalyst contains about 1000 to about 1250 ppm nickel. In a further embodiment, the catalyst contains about 1500 ppm nickel. In yet another embodiment, the catalyst contains about 1000 ppm nickel. In a further embodiment, the catalyst contains about 750 ppm nickel. In another embodiment, the catalyst contains about 600 ppm nickel. In a further embodiment, the catalyst contains about 500 ppm nickel. In yet another embodiment, the catalyst contains about 6,000 ppm iron. In a still further embodiment, the catalyst contains an accumulated total iron content from about 550 ppm to about 5000 ppm. In another embodiment, the catalyst contains an accumulated total iron content from about 550 ppm to about 6000 ppm. In yet another embodiment, the catalyst contains an accumulated total iron content from about 550 ppm to about 4500 ppm. In a further embodiment, the catalyst contains an accumulated total iron content from about 1000 ppm to about 3500 ppm. In another embodiment, the catalyst contains an accumulated total iron content from about 1500 ppm to about 2500 ppm. In a further embodiment, the catalyst contains an accumulated total iron content from about 2000 ppm to about 3000 ppm.

As a result of these metal concentrations, in one embodiment, the magnetic susceptibility of the catalyst is about $4.5 \times 10^{-6}$ emu/g. In another embodiment, the magnetic susceptibility of the catalyst is about $4.5 \times 10^{-7}$ emu/g to about $4.5 \times 10^{-6}$ emu/g. In another embodiment, the magnetic susceptibility of the catalyst is not more than about $4.5 \times 10^{-6}$ emu/g. In a further embodiment, the magnetic susceptibility of the catalyst is less than about $4.0 \times 10^{-6}$ emu/g. In yet another embodiment, the magnetic susceptibility of the catalyst is less than about $3.0 \times 10^{-6}$ emu/g. In a further embodiment, the magnetic susceptibility of the catalyst is in the range of about $2 \times 10^{-6}$ emu/g to about $4.5 \times 10^{-6}$ emu/g. In another embodiment, the magnetic susceptibility of the catalyst is in the range of about $3 \times 10^{-6}$ emu/g to about $4.5 \times 10^{-6}$ emu/g. In still another embodiment, the magnetic susceptibility of the catalyst is in the range of about $3.5 \times 10^{-6}$ emu/g to about $4.5 \times 10^{-6}$ emu/g.

In some embodiments, the metal content of the catalyst is also determined by characterizing the nickel equivalents of the material, which corresponds to the sum of the nickel and vanadium content divided by four. In one embodiment, the catalyst has about 500 ppm to about 4000 ppm nickel equivalents. In another embodiment, the catalyst has about 500 ppm to about 2000 ppm nickel equivalents. In a further embodiment, the catalyst has about 500 ppm to about 1000 ppm nickel equivalents. In yet another embodiment, the catalyst has about 1000 ppm to about 2000 ppm nickel equivalents. At these ranges, the catalyst has a magnetic susceptibility of less than about $4.5 \times 10^{-6}$ emu/g. In another embodiment, the catalyst has about 25 ppm to about 800 ppm nickel equivalents. At these ranges, the catalyst has a magnetic susceptibility of less than about $2.5 \times 10^{-6}$ emu/g.

In other embodiments, the processes of the invention are also characterized by the reduction in the metal content of the catalyst after the separation process. The reduction is determined by comparing the concentration of nickel equivalents in the FCC ECAT before separation to the concentration of nickel equivalents in the recovered or reclaimed fraction. In one embodiment, the nickel equivalents content of the equilibrium catalyst is reduced by about 100 ppm to about 1500 ppm. In another embodiment, the nickel equivalents content of the equilibrium catalyst is reduced by about 100 ppm to about 1000 ppm. In a further embodiment, the nickel equivalents content of the equilibrium catalyst is reduced by about 100 ppm to about 800 ppm. In yet another embodiment, the nickel equivalents content of the equilibrium catalyst is reduced by about 200 ppm to about 800 ppm. In one embodiment, the nickel equivalents content of the equilibrium catalyst is reduced by at least about 100 ppm. In another embodiment, the nickel equivalents content of the equilibrium catalyst is reduced by approximately 250 ppm. In a further embodiment, the nickel equivalents content of the equilibrium catalyst is reduced by approximately 800 ppm. In yet another embodiment, the nickel equivalents content of the equilibrium catalyst is reduced by approximately 1500 ppm.

In one embodiment, the discarded FCC catalyst comprises a zeolite molecular sieve catalyst containing at least about 5% by weight of sieve.

The separation of FCC ECAT with a magnetic susceptibility of less than about $4 \times 10^{-6}$ emu/g is dependant upon various factors, including but not limited to magnet size, external magnetic force (belt thickness and magnet strength), belt speed, and feed rate.

The magnetic field strength of the process of the present invention ranges from at least about 8,000 gauss to at least about 50,000 gauss. Thus, in one embodiment, the magnetic field strength is about 50,000 gauss. In another embodiment, the magnetic field strength is about 30,000 gauss. In a further embodiment, the magnetic field strength is about 20,000 gauss. In still another embodiment, the separation device comprises both a permanent magnet and an electro-magnet.

Achieving magnetic field strength in these ranges is dependent on the magnet size, as well as the thickness of the moving belt. In one embodiment, the present invention utilizes a magnet with at least about a 6-inch diameter, resulting in longer retention times of the catalyst on the magnet than 3 or 4-inch diameter magnets. The separation process uses one quarter of the circumference of the magnet for the separation process. With respect to separation efficiency, a larger diameter magnet allows more time for each particle to be exposed to the magnetic field. For example, a 6-inch diameter magnet provides a 50% increase in retention time or separation time compared to a four-inch diameter magnet. Likewise, a 6-inch diameter magnet provides a 100% increase in separation time over that of a 3-inch magnet. Thus, when the belt is running at a constant speed, there is a linear relationship between the magnet diameter and the separation force. As the diameter of the magnet increases, the separation force on the particle increases. This force excludes the magnetic force acting on each particle. As a result of this separation force, the portion of the equilibrium catalyst with low metals content is thrown farther away from the magnet. In some embodiments, the magnet diameter is about 6 inches to about 10 inches. In other embodiments, the magnet diameter is about 6 inches to about 8 inches. In further embodiments, the magnet diameter is at least about 6 inches. In other embodiments, the magnet diameter is at least about 8 inches. In further embodiments, the magnet diameter is at least about 10 inches.

In some aspects, the belt thickness also affects the magnetic field strength of the magnet. Thicker belts are associated with a decrease in the magnetic field strength of the magnet. The belt thickness of the present invention ranges from about 1 mil to about 100 mil. In one embodiment, the belt thickness is about 10 mil. In another embodiment, the belt thickness is about 8 mil. In a further embodiment, the belt thickness is about 4 mil. In a still further embodiment, the belt thickness is about 2 mil.

In one embodiment, the magnetic separation of the invention utilizes a fiberglass belt. In another embodiment, the magnetic separation of the invention utilizes a Kevlar™ belt. In still another embodiment, the belt is coated with Teflon™.

In some embodiments, the separation device further comprises a magnetic field diverter, which diverts the magnetic field repulsion (north to north or south to south) between two like poles (i.e., between the north poles or the south poles of the adjacent magnets in the magnet roll) and directs the field to the outer radial surface of the magnet. This configuration produces the pole magnetic field flux strength, which is either positive for a north pole interaction or negative for a south pole interaction. The magnetic field diverter is positioned between each magnet of the plurality of magnets. The magnetic field diverter diverts the magnetic field of the plurality of magnets and provides a pole magnetic field flux strength from about 12,000 gauss to about 40,000 gauss. Magnetic field diverters are known to those of skill in the art. Magnetic field diverters capable of providing the pole magnetic field flux described herein are commercially available. In one embodiment, the magnetic field diverter provides pole magnetic field flux strength of at least about 12,000 gauss. In another embodiment, the magnetic field diverter provides pole magnetic field flux strength from about 12,000 gauss to about 24,000 gauss. In a further embodiment, the magnetic field diverter provides pole magnetic field flux strength from about 14,000 gauss to about 16,000 gauss. The magnetic field flux at each magnetic pole is either positive or negative in dimension.

The belt speed adjustment in the process system is tied to the process feed rate and magnetic properties of the ECAT. At higher feed rates and higher magnetic catalyst properties, the belt speed must be faster to achieve the goal of having a thin layer, which helps in the separation of the catalyst particles. At lower feed rates and lower magnetic susceptibilities, the belt speed can be lower as the layer is thin, thus the time each catalyst particle exposed to the magnetic field is longer. Also at lower magnetic properties and high feed rates, a higher belt speed is used to provide the thin layer and imparts the increased momentum on each particle to make the fan distribution for the improved separation.

The belt speed affects two separation factors. One is the amount of force on each particle as noted above and the other is layer thickness of the ECAT on the belt covering the magnet. To be able to separate a lower magnetic susceptibility FCC ECAT, a larger magnet diameter as well as a higher magnetic field force is needed. With increasing belt speeds, there is a commensurate increase in the centrifugal force applied to the particles (see FIG. 3). In addition, as the magnet diameter increases with respect to belt speed, the amount of force applied onto the particles due to rotational speed of the magnet increases the force on the particles. Also, the belt speed is related to the thickness of the material as it is laid down on the belt. At a slow belt speed, the material lay down onto the belt is thick, while at higher belt speeds, the material lay down is thinner, requiring less time for the particles to travel to the magnet magnetic poles. The belt speed of the magnetic separation processes of the invention ranges from about 100 ft/min to about 340 ft/min. In some embodiments, the belt speed ranges from about 150 ft/min to about 300 ft/min. In other embodiments, the belt speed ranges from about 200 ft/min to about 250 ft/min. In some embodiments, the belt speed is about 325 ft/min. In other embodiments, the belt speed is about 250 ft/min.

The process of the present invention is not associated with any refinery process unit or inside any refinery plant. Because the process is decoupled from the refinery process, in one aspect, the magnetic separation occurs at ambient temperature. In another aspect, the magnetic separation occurs at ambient atmosphere. In a further aspect, the magnetic separation occurs at both ambient temperature and ambient atmosphere. In addition to not requiring an elaborate cooling system, the process is able to achieve improved separation of the magnetic material. The magnetic properties of the ECAT are related to temperature. At higher temperature, the magnetic properties of the material decrease. The temperature of magnetic separation units known in the art is limited by being connected to an FCC unit. Because of the system limitations, the temperature of the material can only be cooled to approximately 212° F. (100° C.). With further air cooling, the material can only be cooled to 125° F. (52° C.). Because the magnetic properties of the ECAT are not optimal at this point, catalyst containing lower amounts of metals cannot be effectively separated from the younger, more virgin catalyst materials. Also, the higher temperature material imparts heat to the magnets, which decreases the magnetic field strength of the magnets and likewise the separation effectiveness of the process system. Conversely, the process of the present invention is carried out at lower temperatures, allowing for improved separation of materials containing low amounts of metals. Therefore, in one embodiment, the temperature of the magnetic separation process is carried out at ambient temperature and pressure. In another embodiment, the process is carried out about 10° F. above ambient temperature (i.e., approximately 6° C. above ambient temperature). In yet another embodiment, the process is carried out about 25° F. above ambient temperature (i.e., approximately 14° C. above ambient temperature).

EXAMPLES

To simulate the magnetic separation process of the invention, the following lab scale experiments were performed. These experiments simulate a refinery that discards 3 tons per day of high vanadium, low nickel FCC equilibrium catalyst to make room for fresh FCC catalyst.

Example 1

A simulated sample of discarded FCC equilibrium catalyst having high vanadium content and low nickel content was prepared. The simulated catalyst was processed according to the process described herein at the following parameters: belt speed 325 ft/min, magnet strength of 15,000 gauss, 115 degree divider/splitter setting, 5 mil belt thickness, and six-inch diameter magnets. The process was performed at ambient environmental conditions. As shown below, 80% of undesired equilibrium FCC catalyst fraction and 20% of the desired reclaimed FCC equilibrium catalyst was collected. The following results were obtained:

| Material | Nickel (ppm) | Iron (ppm) | Vanadium (ppm) | Activity, Conv. Wt. % |
|---|---|---|---|---|
| FCC ECAT | 676 | 3722 | 3311 | 62.00 |
| Desired 20% | 385 | 3096 | 1729 | 72.00 |
| Undesired 80% | 749 | 3879 | 3707 | 59.75 |

The 20% desired recovered FCC equilibrium catalyst contains 43% less nickel content, 48% less vanadium content, 17% less iron content, and a 16% higher activity than the starting FCC equilibrium catalyst. These data confirm that the magnetic separation process of the invention is able to effectively remove the undesired portion of the catalyst, leaving a higher activity catalyst that can be recycled into other operations.

Example 2

A simulated sample of discarded FCC equilibrium catalyst having high vanadium content and low nickel content was prepared. The simulated catalyst was processed according to the process described herein at the following parameters: belt speed 325 ft/min, magnet strength of 15,000 gauss, 115 degree divider/splitter setting, 5 mil belt thickness, and six-inch diameter magnets. The process was performed at ambient environmental conditions. As shown below, 70% of undesired equilibrium FCC catalyst fraction and 30% of the desired reclaimed FCC equilibrium catalyst was collected. The following results were obtained:

| Material | Nickel (ppm) | Iron (ppm) | Vanadium (ppm) | Activity, Conv. Wt. % |
|---|---|---|---|---|
| FCC ECAT | 676 | 3722 | 3311 | 62.00 |
| Desired 30% | 486 | 3288 | 2340 | 68.00 |
| Undesired 70% | 757 | 3908 | 3727 | 59.71 |

The 30% desired recovered FCC equilibrium catalyst contains 28% less nickel content, 29% less vanadium content, 12% less iron content, and a 10% higher activity than the starting FCC equilibrium catalyst. These data confirm that the magnetic separation process of the invention is able to effectively remove the undesired portion of the catalyst, leaving a higher activity catalyst that can be recycled into other operations.

These examples further illustrate that, by removing the older particles in the FCC equilibrium catalyst mixture, the FCC equilibrium catalyst particles exhibiting lower deactivation have more desirable characteristics than the FCC equilibrium catalyst as a whole, resulting in superior catalyst being offered to the petroleum refiner than in the present FCC equilibrium catalyst market.

While there has been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. A process for recovering waste FCC equilibrium catalyst, wherein the magnetic susceptibility of the catalyst is less than about $4.5 \times 10^{-6}$ emu/g, the process comprising:
   a. transporting the FCC equilibrium catalyst from an FCC operation to a site located apart from the FCC operation;
   b. transferring the catalyst to a receiving means for processing into at least one separation device; wherein each separation device comprises:
      (i) a plurality of magnets, wherein the plurality of magnets operates with sufficient speed to impart momentum energy to particles of the FCC equilibrium catalyst and wherein each magnet is at least about 6 inches in diameter so that particles moving past the plurality of magnets are exposed to a magnetic separation force generated by the plurality of magnets for a longer time relative to magnets of smaller diameter; and
(ii) a belt;
c. separating the catalyst into a discard fraction, having higher metals content and lower activity, and a recovered fraction, having low metals content, the separating step comprising the steps of:
(i) passing a thin layer of catalyst through the separation device at a belt speed sufficient to produce a fan-shaped distribution leaving the belt; whereby the higher magnetic particles of the FCC equilibrium catalyst adhere to the belt;
(ii) adjusting a splitter into the fan-shaped distribution to capture the discard fraction; and
(iii) gravity feeding the recovered fraction into a receiving means; and
d. transferring the recovered fraction for reuse.

2. The process of claim 1, further comprising the step of passing the catalyst through a filter screen for eliminating unwanted material larger than a predetermined size from the FCC equilibrium catalyst.

3. The process of claim 2, wherein the step of passing the catalyst through a filter screen is performed after the step of transporting the FCC equilibrium catalyst to a site located apart from the FCC operation.

4. The process of claim 2, wherein the unwanted material is selected from the group comprising metal fragments, refractory, materials greater than 35 mesh and materials greater than 500 micron.

5. The process of claim 1, comprising two separation devices arranged in parallel.

6. The process of claim 1, wherein approximately about fifty percent of the high metals material in the catalyst is retained in the discard fraction.

7. The process of claim 1, wherein approximately about twenty percent of the equilibrium catalyst is recovered.

8. The process of claim 1, wherein each magnet has no more than about a six-inch diameter.

9. The process of claim 1, wherein the separating step is performed at ambient temperature.

10. The process of claim 1, wherein the separating step is performed at a belt speed in the range from about 100 feet per minute to about 340 feet per minute.

11. The process of claim 1, wherein the separating step is performed at a belt speed of about 325 feet per minute.

12. The process of claim 1, wherein the belt is no more than about 4 mil thick.

13. The process of claim 1, wherein the separation device comprises a permanent magnet.

14. The process of claim 1, therein the separation device comprises an electro-magnet.

15. The process of claim 1, wherein the separation device comprises both a permanent magnet and an electro-magnet.

16. The process of claim 1, wherein the FCC equilibrium catalyst comprises from about 500 ppm to about 4000 ppm of nickel equivalents of heavy metals.

17. The process of claim 1, wherein the FCC equilibrium catalyst comprises from about 1000 ppm to about 2000 ppm of nickel equivalents of heavy metals.

18. The process of claim 1, wherein the nickel equivalents content of the equilibrium catalyst is reduced by at least about 100 ppm.

19. The process of claim 1, wherein the nickel equivalents content of the equilibrium catalyst is reduced by about 500 ppm.

20. The process of claim 1, wherein the discarded FCC catalyst comprises a zeolite molecular sieve catalyst comprising at least about 5% by weight of sieve.

21. The process of claim 1, wherein the splitter comprises a single knife device under the plurality of magnets to efficiently cut into the catalyst fan, thereby increasing the amount of discarded product.

22. The process of claim 1, wherein the catalyst comprises from about 500 ppm to about 5000 ppm iron.

23. The process of claim 1, wherein the catalyst comprises an accumulated total iron content from about 550 ppm to about 6000 ppm.

24. The process of claim 1, wherein the catalyst comprises an accumulated total iron content from about 550 ppm to about 4500 ppm.

25. The process of claim 1, wherein the FCC equilibrium catalyst is passed through the separation device on a dry basis.

26. The process of claim 1, wherein the magnetic susceptibility of the catalyst is less than about $4.5 \times 10^{-6}$ emu/g.

27. The process of claim 1, wherein each magnet has a strength ranging from about 25,000 gauss to about 50,000 gauss.

28. The process of claim 1, further comprising a magnetic field diverter, wherein the magnetic field diverter is positioned between each magnet; and wherein the magnetic field diverter comprises material which diverts the magnetic field and provides pole magnetic field flux strength from about 12,000 gauss to about 40,000 gauss.

29. The process of claim 28, wherein the magnetic field diverter provides pole magnetic field flux strength from about 14,500 gauss to about 40,000 gauss.

30. The process of claim 1, wherein the strength of the magnetic field flux at each magnetic pole is in the range from about 12,000 gauss to about 24,000 gauss.

31. The process of claim 1, wherein the strength of the magnetic field flux at each magnetic pole is in the range from about 14,000 gauss to about 16,000 gauss.

32. The process of claim 1, wherein the discard fraction is recycled to other industrial applications.

33. The process of claim 1, wherein the recovered fraction is redistributed into an FCC cracking unit.

34. The process of claim 33, wherein the FCC cracking unit is different from the FCC cracking unit where the waste catalyst was sourced.

35. The process of claim 1, further comprising the step of returning the treated FCC equilibrium catalyst to the FCC operation where the catalyst was sourced.

36. Recovered FCC equilibrium catalyst, wherein the catalyst is recovered from a process comprising the steps of:
a. transporting waste FCC equilibrium catalyst from an FCC operation to a site located apart from the FCC operation;
b. transferring the catalyst to a receiving means for processing into at least one separation device; wherein each separation device comprises:
(i) a plurality of magnets, wherein the plurality of magnets operates with sufficient speed to impart momentum energy to particles of the FCC equilibrium catalyst and wherein each magnet is at least about 6 inches in diameter so that particles moving past the plurality of magnets are exposed to a magnetic separation force generated by the plurality of magnets for a longer time relative to magnets of smaller diameter; and
(ii) a belt;

c. separating the catalyst into a discard fraction, having higher metals content and lower activity, and a recovered fraction, having low metals content, the separating step comprising the steps of:
   (i) passing a thin layer of catalyst through the separation device at a belt speed sufficient to produce a fan-shaped distribution leaving the belt; whereby the higher magnetic particles of the FCC equilibrium catalyst adhere to the belt;
   (ii) adjusting a splitter into the fan-shaped distribution to capture the discard fraction; and
   (iii) gravity feeding the recovered fraction into a receiving means; and
d. transferring the recovered fraction for reuse.

37. The process of claim 36, comprising two separation devices arranged in parallel.

38. A process for reusing FCC equilibrium catalyst, comprising the steps of:
   a. transporting waste FCC equilibrium catalyst from an FCC operation to a site located apart from the FCC operation;
   b. transferring the catalyst to a receiving means for processing into at least one separation device; wherein each separation device comprises:
      (i) a plurality of magnets, wherein the plurality of magnets operates with sufficient speed to impart momentum energy to particles of the FCC equilibrium catalyst and wherein each magnet is at least about 6 inches in diameter so that particles moving past the plurality of magnets are exposed to a magnetic separation force generated by the plurality of magnets for a longer time relative to magnets of smaller diameter; and
      (ii) a belt;
   c. separating the catalyst into a discard fraction, having higher metals content and lower activity, and a recovered fraction, having low metals content, the separating step comprising the steps of:
      (i) passing a thin layer of catalyst through the separation device at a belt speed sufficient to produce a fan-shaped distribution leaving the belt; whereby the higher magnetic particles of the FCC equilibrium catalyst adhere to the belt;
      (ii) adjusting a splitter into the fan-shaped distribution to capture the discard fraction; and
      (iii) gravity feeding the recovered fraction into a receiving means; and
   d. transferring the discard fraction for reuse.

39. The process of claim 38, comprising two separation devices arranged in parallel.

40. A process for recovering waste FCC equilibrium catalyst, wherein the magnetic susceptibility of the catalyst is less than about $4.5 \times 10^{-6}$ emu/g, the process comprising:
   a. transporting the FCC equilibrium catalyst from an FCC operation to a site located apart from the FCC operation;
   b. transferring the catalyst to a receiving means for processing into at least one separation device; wherein each separation device comprises:
      (i) a magnetic roller, wherein the magnetic roller operates with sufficient speed to impart momentum energy to particles of the FCC equilibrium catalyst and wherein the magnetic roller has at least about a six-inch diameter so that particles moving past the plurality of magnets are exposed to a magnetic separation force generated by the plurality of magnets for a longer time relative to magnets of smaller diameter; and
      (ii) a belt;
   c. separating the catalyst into a discard fraction, having higher metals content and lower activity, and a recovered fraction, having low metals content, the separating step comprising the steps of:
      (i) passing a thin layer of catalyst through the separation device at a belt speed sufficient to produce a fan-shaped distribution leaving the belt; whereby the higher magnetic particles of the FCC equilibrium catalyst adhere to the belt;
      (ii) adjusting a splitter into the fan-shaped distribution to capture the discard fraction; and
      (iii) gravity feeding the recovered fraction into a receiving means; and
   d. transferring the recovered fraction for reuse.

* * * * *